(12) United States Patent
Unger

(10) Patent No.: US 6,985,669 B1
(45) Date of Patent: Jan. 10, 2006

(54) METHOD AND SYSTEM FOR ELECTRONIC CAPTURE OF USER-SELECTED SEGMENTS OF A BROADCAST DATA SIGNAL

(75) Inventor: Robert Allan Unger, ElCajon, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 620 days.

(21) Appl. No.: 09/711,435

(22) Filed: Nov. 13, 2000

(51) Int. Cl.
*H04N 5/91* (2006.01)

(52) U.S. Cl. .......................................... 386/46; 386/83
(58) Field of Classification Search ................. 386/46, 386/68, 95, 83, 125, 126; 360/5
See application file for complete search history.

(56) References Cited

U.S. PATENT DOCUMENTS

| | | | | |
|---|---|---|---|---|
| 4,963,995 A | * | 10/1990 | Lang | 386/54 |
| 5,237,462 A | * | 8/1993 | Jo | 386/83 |
| 5,282,092 A | * | 1/1994 | Wilhelms | 360/5 |
| 5,438,423 A | * | 8/1995 | Lynch et al. | 386/109 |
| 5,990,881 A | * | 11/1999 | Inoue et al. | 345/720 |
| 6,263,147 B1 | * | 7/2001 | Tognazzini | 386/46 |
| 6,311,011 B1 | * | 10/2001 | Kuroda I | 386/46 |
| 6,580,871 B1 | * | 6/2003 | Proidl | 386/95 |
| 6,642,939 B1 | * | 11/2003 | Vallone et al. | 345/721 |
| 6,678,463 B1 | * | 1/2004 | Pierre et al. | 386/83 |

* cited by examiner

*Primary Examiner*—Huy Nguyen
(74) *Attorney, Agent, or Firm*—Steven L. Nichols; Rader, Fishman & Grauer PLLC

(57) ABSTRACT

A personal video recorder (PVR) includes a "bookmark" feature with which a user can specify and capture segments of an audiovisual program, for example, a television broadcast, that contain information or content that the user wishes to record for later access. A dedicated button on the PVR or a remote control sends a "bookmark" command to the PVR which causes it to record a predetermined number of proceeding and following seconds of the program content. The preceding video signal is taken from a buffer in the PVR, with succeeding video being recorded as it is passed through the PVR to a connected television set. Each captured clip is indexed and labeled for subsequent retrieval.

13 Claims, 4 Drawing Sheets

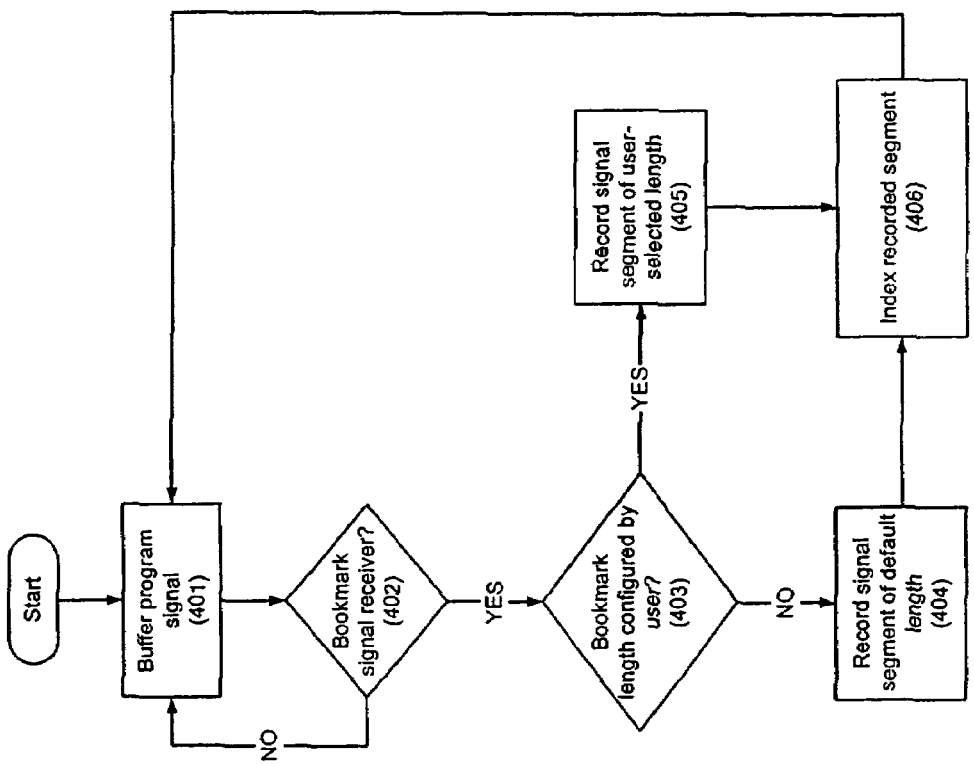

METHOD AND SYSTEM FOR ELECTRONIC CAPTURE OF USER-SELECTED SEGMENTS OF A BROADCAST DATA SIGNAL

FIELD OF THE INVENTION

The present invention relates to the field of broadcast data signals, particularly television signals whether broadcast over-the-air, by cable network, satellite system or some other means. More specifically, the present application relates to a method and system of electronically capturing and recording for later retrieval specified segments of the television signal.

BACKGROUND OF THE INVENTION

Television is widely used in modern society both as a source of information and as entertainment. Cable and satellite systems can supplement local over-the-air broadcasting to provide dozens or even hundreds of channels of programming. In addition to the programming, advertisements are also broadcast and can provide viewers with important information related to products and services of which viewers have a need.

Consequently, the viewer may frequently have a desire to capture a particular piece of information or program segment from a television broadcast. For example, when seeing a commercial for a particular product or service that the viewer wishes to purchase, the viewer may wish to capture important information from the commercial about that product or service. The viewer may want to capture a phone number, an e-mail address, a web-site address (URL), pricing information, location information, sale date and time information, etc., that is broadcast in the commercial.

Conventionally, the user has been required to quickly obtain writing materials in order to capture such information. For this reason, television commercials frequently repeat important information to better allow a user to obtain writing materials and note that information or remember it until it can be written down.

In addition to such textual information that can be written down by a viewer, viewers may also want to actually capture a segment of the audiovisual signal of the television broadcast. For example, the viewer may want to capture a highlight in a sporting event or a news announcement so that the video clip can be accessed later by the viewer to be shown to another person who would be interested. A student may want to extract a portion of an educational program.

At present, there a number of electronic devices that can be used to record broadcast television signals. These devices may be generally categorized as video cassette recorders (VCRs) and Personal Video (or Versatile) Recorders (PVRs).

A VCR uses a magnetic tape to allow the user to record incoming audiovisual programming while watching the same or a different channel. A VCR also allows the user to record broadcasts using a timer and a preprogrammed recording schedule so that programs can be recorded when the user is away and cannot watch the desired programming. Consequently, the VCR allows the user to capture programming that would otherwise be missed so that the programming can be watched at the user's convenience.

However, the VCR is designed to record entire programs. If the user happens to see a commercial containing important information that the user wishes to capture, unless the user has prepared the VCR beforehand so as to be ready to record, the VCR will likely not be ready to record and cannot be prepared or accessed quickly enough to record the commercial. Thus, the VCR is poorly adapted to meet the viewer's need to spontaneously record important information from television commercials.

The VCR is also poorly adapted to meet the viewer's need to spontaneously record small segments from programming that the viewer will want to access later. In this instance, the viewer can at least anticipate that a program will contain material he or she wishes to record. The viewer cannot so anticipate the content of television commercials. However, the user will then need to record entire programs to be sure of recording the material he or she wishes to preserve. If the entire program is not recorded, the user runs the risk of failing to quickly activate the VCR in time to capture the moment or segment of the programming desired. Once the entire program is recorded, the user must then fast forward and rewind through the entire program to find those segments he or she wishes to preserve.

The basic concept of the VCR has recently been extended to digital compression devices that provide even more features for managing the reception and recording of audiovisual programming. These products have a number of names such as personal television products, personal video recorders, video recording computers, personal television servers, etc., (referred to collectively as "personal video recorders" or PVRs hereafter). Current examples of personal video recorders include the TiVo® system made by TiVo, Inc. and the ReplayTV® system made by Reply Networks, Inc.

Personal video recorders replace the video cassette recording medium with a hard drive internal to the recorder. The personal video recorder is connected between a user's television set and that user's cable box, satellite receiver or antenna. The personal video recorder can control the channel tuned on the television, provide an interactive electronic program guide and record programming on a manual or timer-controlled basis. Additionally, the personal video recorder can buffer incoming audiovisual programming so that the viewer can pause a live television program or replay a portion of a live television program without missing any subsequent segment of the program, as long as the pause or replay does not exceed the capacity of the buffer.

In even more advanced features, the personal video recorder can be programmed to regularly record a user's favorite programs and then also record other programs of the same genre that the user may be interested in watching. Thus, the personal video recorder may help a user watch audiovisual programming that the user is interested in, but was not even aware of at the time it was broadcast.

Consequently, the PVR provides more flexibility in recording and capturing incoming audiovisual signals than is available with a VCR. However, the PVR is still prone to many of the same problems described above, such as the need to record an entire program to avoid missing important segments. Therefore, there is a need in the art for a method and system that allows a viewer of broadcast television programming to capture important information and/or video clips for later use.

SUMMARY OF THE INVENTION

The present invention provides a method and system in which a PVR can be used to spontaneously capture important information or an important video segment from a broadcast of an audiovisual signal without needing to record the entire program to be assured of capturing the desired information or video clip. Specifically, the present invention provides a dedicated PVR function in which, upon a command from the user, the PVR records a segment of the broadcast audiovisual signal for a predetermined period of time both before and after the user's command. The captured video segment is then indexed for easy retrieval.

The present invention may be embodied and described as a personal video recorder having a user-controlled data capture function, where the recorder includes: an input for receiving an audiovisual signal and an output for outputting the audiovisual signal; a buffer or other memory device for buffering the audiovisual signal, the buffer retaining a portion of the audiovisual signal after that portion has been output by the recorder; a data storage unit; and a processor that receives input from a user input device. Upon receipt of a user command input through the user input device, the processor records a segment of the audiovisual signal in the data storage unit. The segment of the audiovisual signal includes two components: a first predetermined amount of the portion of the audiovisual signal retained in the buffer after that same portion has been output by the recorder; and a second predetermined amount of the portion of the audiovisual signal output by the recorder after receipt of the user command. The second predetermined amount may be equal to an amount of time during which the user command is received.

Preferably, the processor also associates an identifying label with each the segment of the audiovisual signal recorded in the data storage unit. The processor can then also generate an index of segments of the audiovisual signal recorded in the data storage unit using the identifying label of each the segment. Preferably, the data storage unit is a hard drive or other similar device providing random access data storage.

The user input device preferably includes at least one remote control unit. The recorder then requires an appropriate receiver for receiving input from the remote control unit. In one preferred embodiment, the user input device comprises a number of remote control units, each of which can issue the user command to the recorder to store a segment of the audiovisual signal. In this case, the processor can record an indication with each segment of the audiovisual signal recorded in the data storage unit as to which remote control unit ordered recording of that segment. In this way, multiple simultaneous users can be supported.

Preferably, the length of the signal segments stored in the data storage unit are controlled by the user. For example, the length of the recorded segment that includes audiovisual signal not output by the recorder when the user command to capture a signal segment was received may be determined by the length of time during which a user pushes a button on the user input device for issuing the user command.

The present invention also encompasses the method of making and operating the personal video recorder described above. Specifically, the present invention includes a method of capturing data with a personal video recorder having a user-controlled data capture function, where the recorder includes: an input for receiving an audiovisual signal and an output for outputting the audiovisual signal; a buffer or other memory device for buffering the audiovisual signal, the buffer retaining a portion of the audiovisual signal after that portion has been output by the recorder; and a data storage unit. The method then includes, upon receipt of a user command, recording a segment of the audiovisual signal in the data storage unit, the segment of the audiovisual signal comprising: a first predetermined amount of the portion of the audiovisual signal retained in the buffer after that same portion has been output by the recorder; and a second predetermined amount of the portion of the audiovisual signal output by the recorder after receipt of the user command.

BRIEF DESCRIPTION OF THE DRAWINGS

The accompanying drawings illustrate the present invention and are a part of the specification. Together with the following description, the drawings demonstrate and explain the principles of the present invention.

FIG. 4 is a flowchart illustrating a method of operating the system of the present invention.

DETAILED DESCRIPTION OF THE PREFERRED EMBODIMENTS

In principle, the present invention provides a dedicated feature for a personal video recorder ("PVR") in which, upon entry of a user command, the PVR records a segment of the audiovisual signal. Preferably, the PVR records a predetermined amount of the signal that both precedes and follows the entry of the user command. In this way, even if the user is somewhat slow in entering the command to capture a segment of the audiovisual signal, enough of the previously viewed signal will also be captured to serve the viewer's needs.

Figure 1:
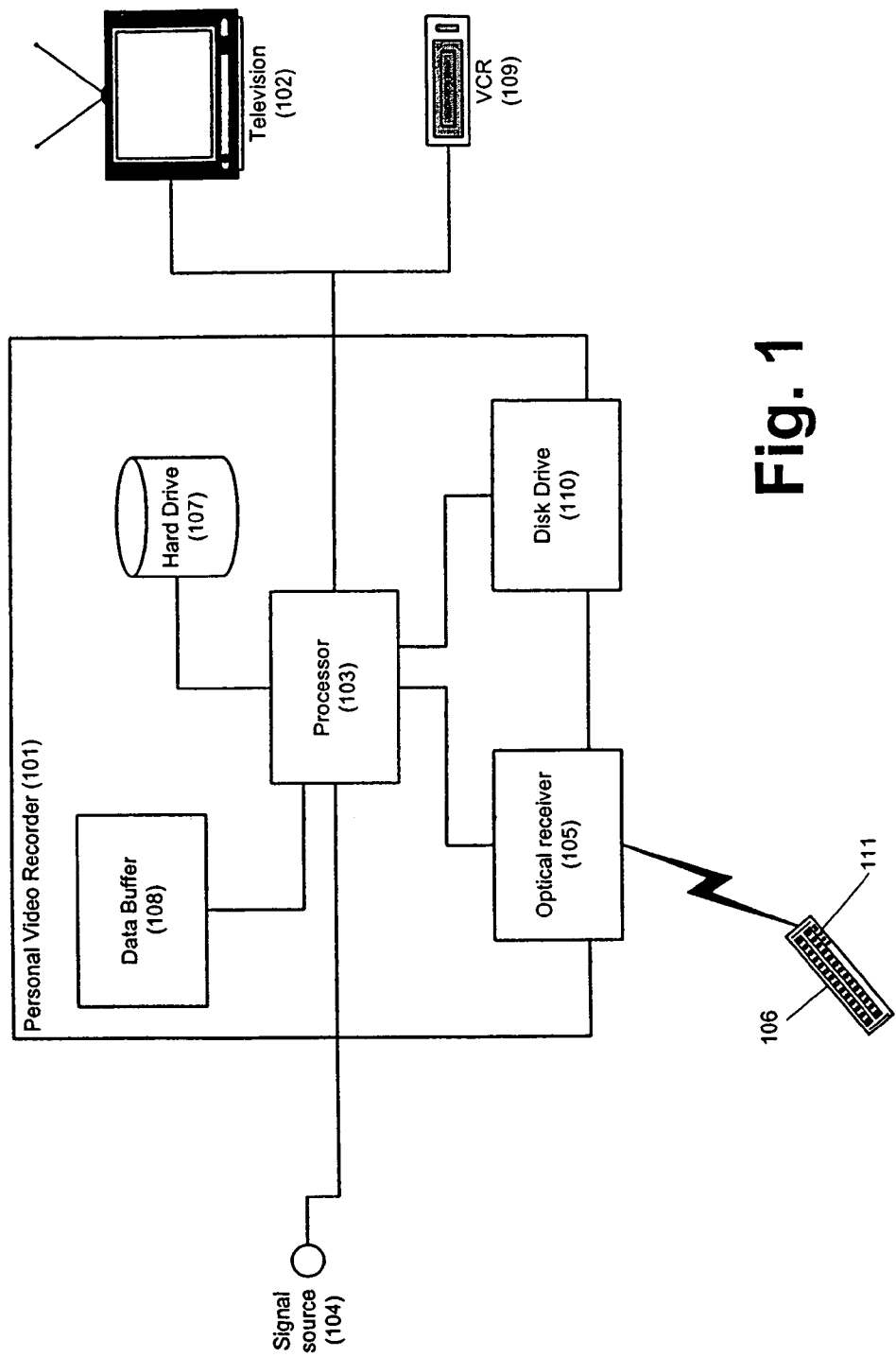
FIG. 1 is a block diagram illustrating a personal video recorder and related system components according to a first embodiment of the present invention.

Using the drawings, the preferred embodiments of the present invention will now be explained. FIG. 1 is a block diagram illustrating a personal video recorder (101) and related system components according to a first embodiment of the present invention. As shown in FIG. 1, the PVR (101) receives an audiovisual signal from a signal source (104) and passes that signal to a television (102) for use by a viewer. The signal source (104) can be any source of an audiovisual signal, including, but not limited to, an over-the-air or terrestrial television antenna, a cable television network, a satellite antenna, a video cassette recorder, a camcorder, a digital video (or versatile) disc player, computer or server, or the like.

The PVR (101) preferably includes a processor (103) and a hard drive (107) on which audiovisual data can be recorded by the processor (103). As the incoming audiovisual signal is received from the signal source (104), it is buffered in a data buffer (108). The data buffer (108) allows the user to pause a live broadcast of a television program for a length of time corresponding to the size of the buffer (108). While the pause feature is active, the incoming audiovisual signal is stored in the buffer and is then sequentially sent to the television (102) when the pause feature is deactivated.

In addition to buffering the incoming audiovisual signal, the buffer (108) will also retain a limited amount of the audiovisual signal that has already been transmitted to the television (102). This allows the user to institute a replay of the program already viewed. The replay is typically up to seven seconds in length.

User commands to the PVR (101), such as activation of the pause feature or the replay feature, are preferably transmitted to the PVR (101) using a remote control unit (106) in the hand of the user. While the remote control unit (106) may include a radio frequency transmitter, or even a supersonic transmitter, the remote control unit (106) preferably uses an optical transmitter, preferably an infrared transmitter, to send user commands to the PVR (101). Consequently, the preferred embodiment of the PVR (101) includes an optical receiver (105) for receiving data signals, i.e. user commands, from the remote control unit (106) and communicating those commands to the processor (103).

Under the principles of the present invention, the PVR (101) has a novel data capture feature that may be referred to as the bookmark feature. Preferably, a dedicated "bookmark" button (111) is provided on the remote control unit (106). As will be appreciated by those skilled in the art, the "bookmark" button and other PVR controls may also be provided on a keypad or other user input device located on the PVR (101) itself.

When the bookmark button (111) is actuated, the PVR (101) is commanded to capture or record a segment of the audiovisual signal from the signal source (104). The segment or video clip recorded will include a predetermined amount of the signal that has most recently been sent to the television (102) as well as a predetermined amount of the signal following the time at which the "bookmark" command is received. In this way, the user need not initiate the "bookmark" command before an event or information which the user desires to capture is shown. Rather, the user can press the "bookmark" button (111) during the event or presentation of the information to be recorded and have the entire segment captured.

As noted above, the data buffer (108) typically retains a limited amount of the audiovisual signal that has already been sent to the television set (102) so that the user can initiate an instant replay of that portion of the programming, if desired. Consequently, the bookmark feature of the present invention can make use of this data retained in the buffer to capture that portion of the audiovisual signal that precedes receipt of the "bookmark" command. Upon receipt of the bookmark command, the processor (103) retrieves some or all of the "replay" data retained in the buffer (108), i.e. data from the audiovisual signal that has already been sent to the television (102), and records that data on the hard drive (107) as part of the data capture initiated by the user's "bookmark" command. A predetermined amount of the audiovisual signal sequentially following that which is retained in and extracted from the buffer (108) is also recorded to complete the captured segment of the audiovisual signal that both precedes and follows entry of the "bookmark" command by the user.

The processor (103) will also create an index and attach a label to the captured signal segment. This label may be any indicator that helps the user distinguish between captured video clips and identify a desired clip. For example, the label may be a time stamp that indicates the time at which the data capture was performed. Alternatively, the label may be a time stamp that indicates how much of the program had been viewed before the data capture was performed. The name of the program from which the captured clip was taken, as provided in an electronic program guide, may also serve as the clip label. Captures from the same program may be numbered sequentially. The user may also, with or without being prompted, input a label for the captured clip using the remote (106) or other user input device.

The clip label, particularly if derived from program guide information, may also serve as a reference that attributes the clip to the material source, i.e., the program from which the clip was taken. Preferably, either the label associated with each clip or the structure of the index of clips may be used to identify the program or other material source from which the clip was taken. For example, all clips from a particular program may be stored in a particular file and so indicated in the index of clips.

In order to facilitate subsequent use of captured video clips, the PVR (101) may include a connection to a VCR (109) so that the user can replay and record specified video clips to a cassette in the VCR (109). This feature may be extremely useful in editing video tape recorded by a camcorder or the like by the user. The user can input the recorded video signal through the signal source (104), identify and capture a number of clips and then replay and record those desired clips, in any order, on a video tape in the VCR (109).

Alternatively, the viewer may capture specific clips from a program already recorded in full on the hard drive (107). The program can be played from the hard drive (107) and specified clips can be captured and indexed as described above.

The PVR (101) may also include a disk drive (110) for floppy disks, zip disks or the like. The user can then retrieve and record captured video clips to a disk. The clip can then be transferred via the disk to a computer for additional editing or transmission as, for example, an attachment to an electronic mail message. Alternatively, the PVR (101) may have a direct connection to a computer or a computer network (such as the Internet) in order to transmit captured video clips.

Figure 2:
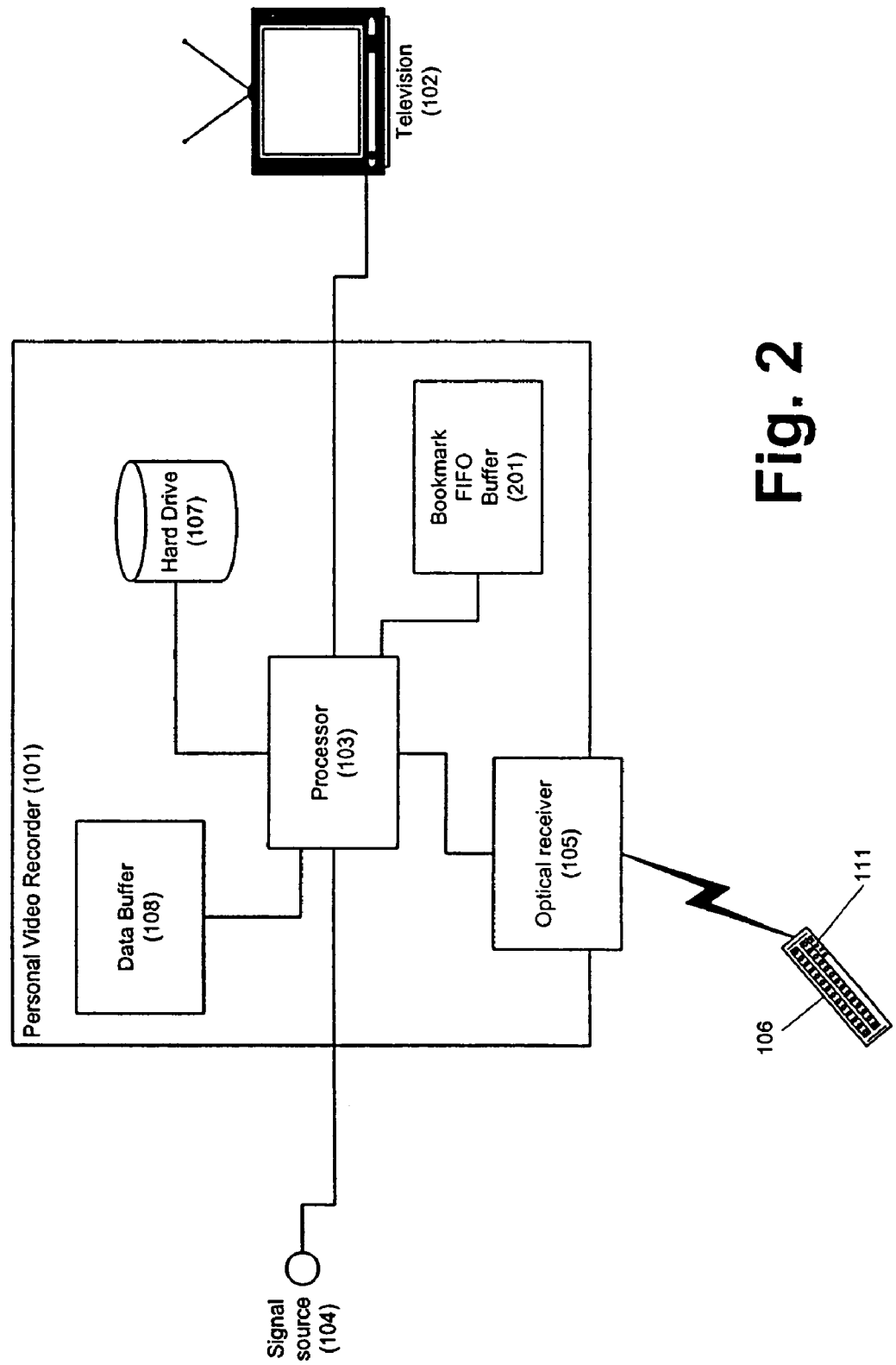
FIG. 2 is a block diagram illustrating a personal video recorder and related system components according to a second embodiment of the present invention.

FIG. 2 illustrates a second embodiment of the present invention. The second embodiment is similar to that in FIG. 1. Identical elements have identical reference numbers. An explanation of these recurring elements will be not be repeated.

The embodiment of the present invention illustrated in FIG. 2 recognizes that, when capturing a video clip using the bookmark feature of the PVR (101), the user may routinely wish to have the captured clip extend backward in time to include more of the already-viewed programming that is or can be buffered in the data buffer (108) to support an instant replay feature. Even if this is not the case, it may be desirable to avoid placing any additional demands on the buffer (108).

Consequently, as shown in FIG. 2, a dedicated bookmark buffer (201) may be provided. This buffer is a "first-in, first-out" (FIFO) buffer that is dedicated to retain data from the incoming audiovisual signal that has already been sent to the television (102). When the "bookmark" command is received, the audiovisual signal that has been sent to the television set (102) preceding that point in time is retrieved from the bookmark buffer (201) and recorded, along with a subsequent amount of the audiovisual signal, as the requested data capture.

In this way, the captured clip can include a greater amount of the program already viewed than would stored in the "replay" buffer of data buffer (108), and no additional demands need be placed on the buffer (108) that would prevent it from performing its other functions, such as providing a pause or instant replay features.

Figure 3:
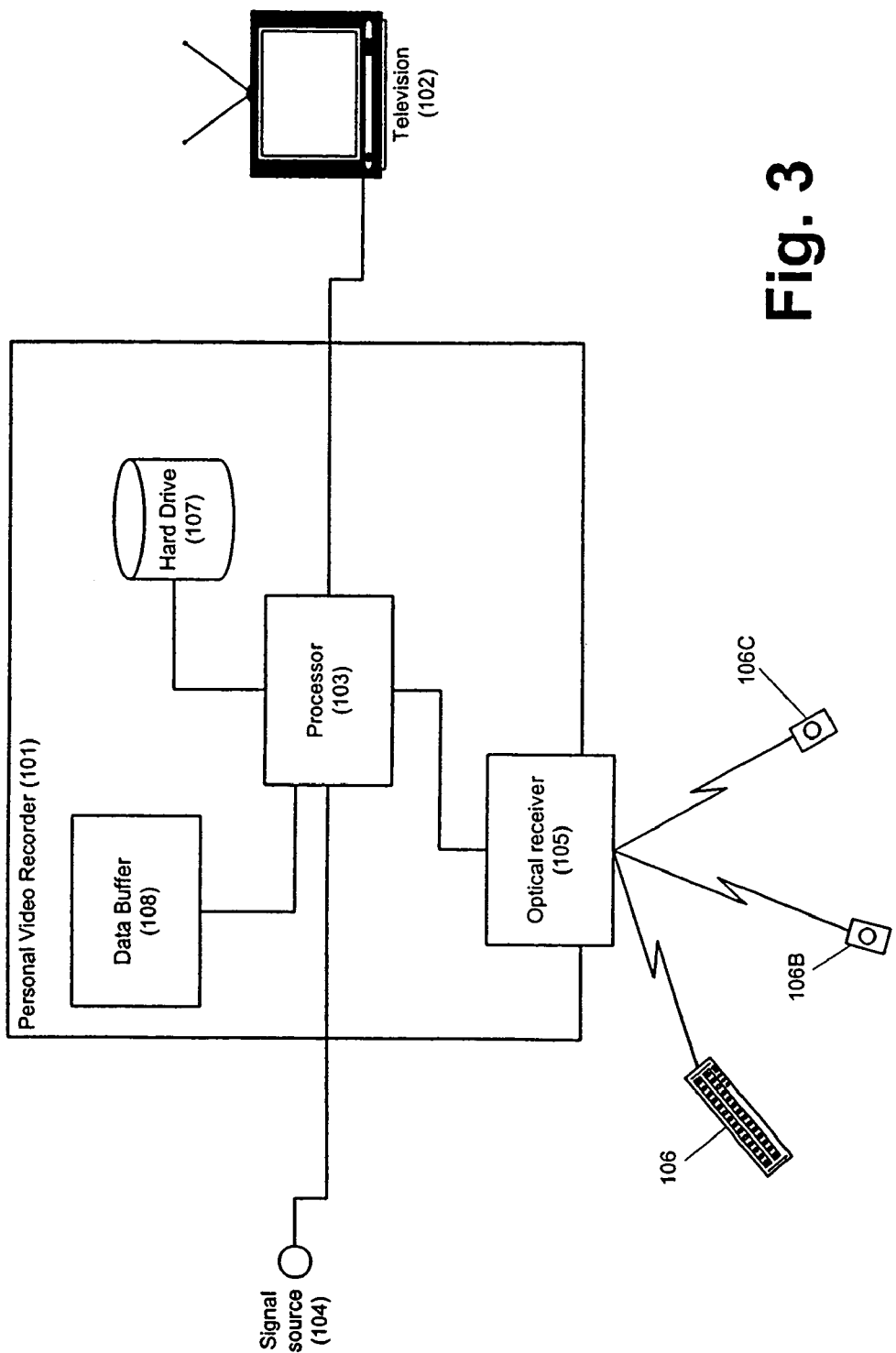
FIG. 3 is a block diagram illustrating a personal video recorder and related system components according to a third embodiment of the present invention.

FIG. 3 illustrates a third embodiment of the present invention. Again, identical reference numbers indicate identical elements and redundant explanations will be omitted. FIG. 3 addresses the situation in which a number of viewers may be watching programming on a television set (102) and each viewer may wish to capture or bookmark particular segments of the broadcast.

In addition to the general remote control (106), a number of additional remote units (106B & 106C) may be provided for use by other viewers. Preferably, the additional remote units (106B & 106C) are limited units in that each has only a "bookmark" key. However, additional features equal to or less than those available on the master remote (106) may also be provided on the additional units (106B & 106C) as desired by user groups.

Preferably, each remote (106, 106B & 106C) will include an identifier in the commands transmitted to the processor (103) so that the processor (103) can distinguish from which remote (106, 106B & 106C) a command has been sent. The processor (103) can then index captured clips according to the remote from which the capture command was initiated. For example, the processor (103) may append an identifier to the label of each captured clip captured in response to a command from a particular remote unit (106, 106B & 106C). Alternatively, all the captured clips requested by, for example, remote unit (106B) may be stored in a particular file on the hard drive (107), while clips captured for the remote unit (106C) are stored in a different file, etc.

FIG. 4 is a flowchart illustrating a preferred method of implementing the present invention. As shown in FIG. 4, the audiovisual program signal is buffered 401 so that data capture, i.e. the bookmark feature, can be initiated and record a portion of the program already viewed as well as a subsequent portion of the program.

The user may spontaneously activate the bookmark feature (402) as desired. Additionally, the PVR of the present invention may allow the user to specify the amount of running time a captured clip should contain (403). For example, the user may pre-set the PVR to record 10 seconds preceding receipt of the "bookmark" command and 10 second following to constitute a captured clip. Alternatively, the running time recorded before and after the "bookmark" command need not be the same. For example, user may pre-set the PVR to record 5 seconds preceding receipt of the "bookmark" command and 15 second following to constitute a captured clip. Entry of this parameter can be performed using the remote control unit (106) or other user data entry device connected to the PVR (101).

Additionally, the user can dynamically specify the length of the clip to be recorded for each clip. In a preferred embodiment, when the "bookmark" command is received, the PVR (101) records a predetermined preceding amount of the program and then continues to record the program subsequently for as long as the user holds down the "bookmark" key (111).

If the user has configured or dynamically controls the amount of program time a bookmark clip is to contain (403), the PVR (101) will record a video clip of that length (405), using the data signal received from the signal source (104) and sent to the television (102) both before and after receipt of the "bookmark" command. Otherwise, a clip of a default length is recorded (404) as described above.

As the clip is recorded, as described above, it will be labeled and indexed (406) for easy identification and retrieval in the future. Retrieval can be controlled using the remote control unit (116) or any other user interface device on or connected to the PVR (101).

A particular application in which the present invention would also be extremely useful is the preparation by legal personnel of video evidence or testimony. Using the present invention, a lawyer, paralegal or other legal personnel can view video evidence or testimony and identify, capture and index specific segments that may need to be accessed and shown during a trial or trial preparation.

The present invention also encompasses the computer-readable instructions that cause the processor (103) of the PVR (101) to perform the "bookmark" function as described above. As used herein, the term "computer-readable instructions" includes software, applications, application extensions and the like irrespective of the language in which written or the level at which written (i.e., source code, object code, etc.). Computer-readable instructions also includes firmware, application specific integrated circuits (ASICs) and any other means of providing logic which can be used to control the operation of a processing device. A "processing device" as used herein can refer to a host computer, a server, a processor or microprocessor (such as processor (103)), a controller, an ASIC or the like.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A personal video recorder comprising:
   an input for receiving an audiovisual signal and an output for outputting said audiovisual signal;
   a buffer for buffering said audiovisual signal, said buffer retaining a portion of said audiovisual signal after that portion has been output by said recorder;
   a data storage unit; and
   a processor that receives input from a user input device;
   wherein, upon receipt of a user command input through said user input device, said processor automatically records a segment of said audiovisual signal in said data storage unit, said segment of said audiovisual signal comprising:
   a first predetermined amount of said portion of said audiovisual signal retained in said buffer; and
   a second predetermined amount of said portion of said audiovisual signal output by said recorder after receipt of said user command;
   wherein said user input device receives parameters from a user that specify said first and second predetermined amounts, said processor then receives said parameters and automatically records said segment based on said parameters.

2. The recorder of claim 1, wherein said processor associates an identifying label with each said segment of said audiovisual signal recorded in said data storage unit.

3. The recorder of claim 2, wherein said processor generates an index of segments of said audiovisual signal recorded in said data storage unit using said identifying label of each said segment.

4. The recorder of claim 1, wherein said data storage unit is a hard drive.

5. The recorder of claim 1, wherein said user input device comprises a remote control unit and said recorder comprises a receiver for receiving input from said remote control unit.

6. A personal video recorder comprising:
   an input for receiving an audiovisual signal and an output for outputting said audiovisual signal;
   a buffer for buffering said audiovisual signal, said buffer retaining a portion of said audiovisual signal after that portion has been output by said recorder;

a data storage unit; and a processor that receives input from a user input device;

wherein, upon receipt of a user command input through said user input device, said processor automatically records a segment of said audiovisual signal in said data storage unit, said segment of said audiovisual signal comprising:

a first predetermined amount of said portion of said audiovisual signal retained in said buffer; and a second predetermined amount of said portion of said audiovisual signal output by said recorder after receipt of said user command, wherein said second predetermined amount is determined by a length of time during which a user holds down a button on said user input device for issuing said user command.

7. The recorder of claim 1, further comprising a disk drive for receiving removable data storage disks, wherein said processor transfers recorded segments from said data storage unit to said disk drive under control of said user input device.

8. A method of operating a personal video recorder comprising:

buffering said audiovisual signal by retaining a portion of said audiovisual signal in a buffer after that portion has been output by said recorder;

receiving a user command input through a user input device; and, in response to said user command, automatically recording a segment of said audiovisual signal in a data storage unit in accordance with parameters input by a user prior to receipt of said user command, said segment of said audiovisual signal comprising:

a first predetermined amount of said portion of said audiovisual signal retained in said buffer, and a second predetermined amount of said portion of said audiovisual signal output by said recorder after receipt of said user command; and receiving user input through said user input device that includes said parameters that specify said first and second predetermined amounts.

9. A personal video recorder that processes an audiovisual signal comprising:

a buffer for buffering said audiovisual signal by retaining a portion of said audiovisual signal after that portion has been output by said recorder;

means for receiving a user command; and, in response to said user command, means for automatically recording a segment of said audiovisual signal in a data storage unit in accordance with parameters input by a user prior to receipt of said user command, said segment of said audiovisual signal comprising:

a first predetermined amount of said portion of said audiovisual signal retained in said buffer; and a second predetermined amount of said portion of said audiovisual signal output by said recorder after receipt of said user command; and means for receiving user input through a user input device to control a length of said first and second predetermined amounts.

10. The recorder of clam 6, wherein said processor associates an identifying label with each said segment of said audiovisual signal recorded in said data storage unit.

11. The recorder of claim 10, wherein said processor generates an index of segments of said audiovisual signal recorded in said data storage unit using said identifying label of each said segment.

12. The recorder of claim 6, wherein said data storage unit is a hard drive.

13. The recorder of claim 6, wherein said user input device comprises a remote control unit and said recorder comprises a receiver for receiving input from said remote control unit.

* * * * *

UNITED STATES PATENT AND TRADEMARK OFFICE
CERTIFICATE OF CORRECTION

PATENT NO. : 6,985,669 B1
DATED : January 10, 2006
INVENTOR(S) : Robert Allen Unger It is certified that error appears in the above-identified patent and that said Letters Patent is hereby corrected as shown below:

<u>Column 10,</u>
Line 23, change "The recorder of clam" to -- The recorder of claim --.

Signed and Sealed this

Twenty-eighth Day of March, 2006

JON W. DUDAS
*Director of the United States Patent and Trademark Office*